United States Patent [19]

Phillips et al.

[11] Patent Number: 5,330,539

[45] Date of Patent: Jul. 19, 1994

[54] FIBER REACTIVE DYES - APPLICATIONS WITH LOW SALT

[75] Inventors: Thomas S. Phillips, North Providence; Kevin D. Costa, Pawtucket, both of R.I.; Werner Russ, Hofheim-Weilbach, Fed. Rep. of Germany; Thomas V. Chambers, Rock Hill, S.C.

[73] Assignee: Hoechst Celanese Corporation, Somerville, N.J.

[21] Appl. No.: 810,731

[22] Filed: Dec. 18, 1991

[51] Int. Cl.$^5$ .................. C09B 62/04; C09B 62/507; C09B 62/085; C09B 62/095

[52] U.S. Cl. .......................... 8/549; 8/618; 8/681; 8/686; 8/918

[58] Field of Search ............ 8/549, 618, 681, 686, 8/918

[56] References Cited

U.S. PATENT DOCUMENTS

| | | | |
|---|---|---|---|
| 4,408,997 | 10/1983 | Perrig | 8/532 |
| 4,826,503 | 5/1989 | Lande | 8/543 |
| 5,139,533 | 8/1992 | Hildebrand | 8/502 |

FOREIGN PATENT DOCUMENTS 63-112781  5/1988  Japan .

OTHER PUBLICATIONS

Hoechst Celanese Corporations' "Remazol" Dyes Exhaust Application Manual Jul. 1987.

*Primary Examiner*—Paul Lieberman
*Assistant Examiner*—Magaret Einsmann
*Attorney, Agent, or Firm*—Hugh C. Crall

[57] ABSTRACT

A method for the exhaust dyeing of materials having hydroxy groups and materials containing carbonamide groups using a low salt content dye bath in conjunction with fiber reactive dyes exemplified by a dye of the following formula:

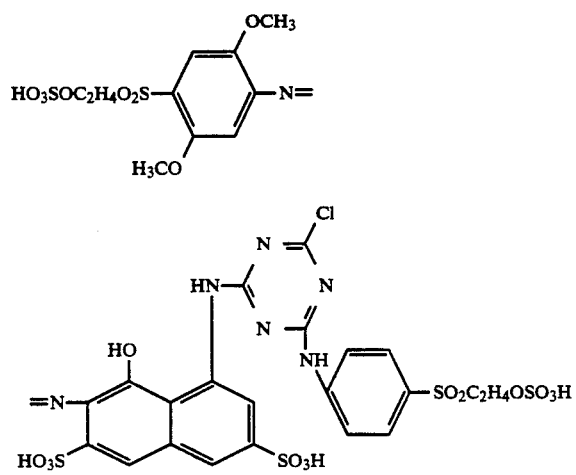

7 Claims, No Drawings

FIBER REACTIVE DYES - APPLICATIONS WITH LOW SALT

BACKGROUND OF THE INVENTION

1. Technical Field

This invention is directed to the field of textile dyeing and in particular to the dyeing of textiles by the exhaust method using fiber reactive dyes containing the fiber reactive vinyl sulfone group.

2. Background

The exhaust method of dyeing is a batch method comprising the immersion of the textile goods in an aqueous solution of dye and various dyeing auxiliary chemicals. The goods are held in the dye bath for a predetermined time usually at an elevated temperature until the dye migrates into and fixes to the fiber. The exhaust dyeing method is well known in the art of coloring textiles; exemplary exhaust dyeing procedures are beck, jig, winch, jet and circulating liquor machine procedures.

In the exhaust dyeing method using fiber reactive vinyl sulfone dyes, one necessary auxiliary chemical is an electrolyte which is added to the dye bath to force the dye to migrate from the solution to the fiber. The most commonly used electrolyte is an inorganic salt such as sodium sulfate or sodium chloride. In exhaust dyeing procedures, this electrolyte is generally employed in amounts from about 20–50 grams per liter to about 100 grams per liter of dye bath with the amount of electrolyte being proportionally higher as the amount of dye employed in the dyeing increases. However, a few fiber reactive dyes are known which are used at reduced electrolyte concentration. After the dyeing process is completed, the exhausted dye bath solution is discharged to waste water treatment facilities for removal of electrolyte and other residual dye bath chemicals.

The present invention provides a method for the exhaust dyeing of textiles using a select class of dyes at significantly lower levels of electrolyte in the dye bath with the attendant reduction in raw materials costs, reduced chemical discharge to the environment and reduced waste water treatment costs. An additional advantage is that the process of the invention unexpectedly gives a higher dyeing efficiency as evidenced by the achievement of higher dye build up values.

SUMMARY OF THE INVENTION

The invention provides a method for the exhaust dyeing of materials having hydroxy groups and materials containing carbonamide groups using a low salt content dye bath in conjunction with specific fiber reactive vinyl sulfone dyes of the general formula:

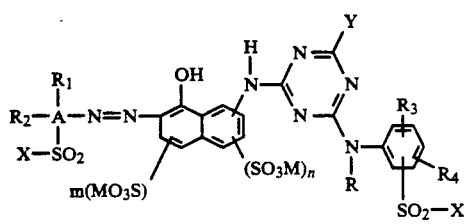

wherein:

M represents a hydrogen atom, or an alkali or alkaline earth metal; preferred metals are sodium, potassium and lithium; n and m are 0 or 1;
A is a benzene nucleus or a naphthalene nucleus;
R is hydrogen or an alkyl group having 1 to 4 carbon atoms;
$R_1$ and $R_2$ are hydrogen, hydroxyl, an alkyl group having 1 to 4 carbon atoms, preferably methyl, an alkoxy group having 1 to 4 carbon atoms, most preferably methoxy; $R_1$ and $R_2$ are the same or different;
$R_3$ and $R_4$ are hydrogen, an alkyl group having 1 to 4 carbon atoms, preferably methyl, an alkoxy group having 1 to 4 carbon atoms, preferably methoxy; $R_3$ and $R_4$ are the same or different;
X is a vinyl group, or a fiber reactive group of the general formula $-CH_2CH_2-Z$ wherein Z is chloro, sulfato, thiosulfato or phosphato, most preferably sulfato; Y is selected from chlorine, bromine or fluorine, preferably chlorine and fluorine, most preferably chlorine and the copper, cobalt, chrome and nickel metal complexes thereof, preferably the copper complex.

Dyes of the above formula can be used in low salt content dye baths having about 10 to 50 grams per liter of inorganic salt. In the conventional exhaust dyeing procedures about 20 to 100 grams per liter of salt are used in the dye bath to cause exhaustion of the dye. Thus the process of the invention achieves at least a 100 percent reduction in the amount of inorganic salt employed.

DESCRIPTION OF THE PREFERRED EMBODIMENTS

Fiber reactive dyes of the vinyl sulfone type are well known in the field of textile dyeing. This invention is directed to the use of a select group of fiber reactive dyes in the exhaust method of dyeing textiles using a low inorganic salt content dye bath. The invention provides a process with other advantages which will be obvious from the following description.

The select group of vinyl sulfone dyes useful in the present invention may be represented in their free acid form by the general formula:

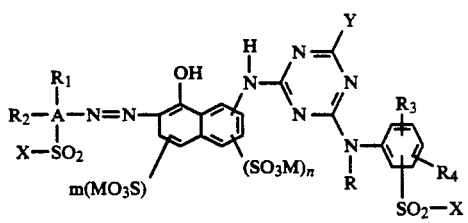

wherein:

M represents a hydrogen atom, or an alkali or alkaline earth metal; preferred metals are sodium, potassium and lithium; n and m are 0 or 1;
A is a benzene nucleus or a naphthalene nucleus;
R is hydrogen or an alkyl group having 1 to 4 carbon atoms;
$R_1$ and $R_2$ are hydrogen, hydroxyl, an alkyl group having 1 to 4 carbon atoms, preferably methyl, an alkoxy group having 1 to 4 carbon atoms, most preferably methoxy; $R_1$ and $R_2$ are the same or different;

$R_3$ and $R_4$ are hydrogen, an alkyl group having 1 to 4 carbon atoms, preferably methyl, an alkoxy group having 1 to 4 carbon atoms, preferably methoxy; $R_3$ and $R_4$ are the same or different;

X is a vinyl group, or a fiber reactive group of the general formula —$CH_2CH_2$—Z wherein Z is chloro, sulfato, thiosulfato or phosphato, most preferably sulfato; Y is selected from chlorine, bromine or fluorine, preferably chlorine and fluorine, most preferably chlorine and the copper, cobalt, chrome and nickel metal complexes thereof, preferably the copper complex.

The above dyes are characterized by having at least two fiber reactive vinyl sulfone groups and at least one fiber reactive halotriazine group.

The dyes described in the present invention are prepared by condensing an amino compound of the general formula:

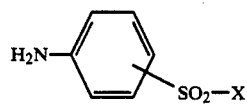

with cyanuric chloride in aqueous medium at a temperature of 0 to 25 degrees Centigrade, over 1-10 hours, while controlling the pH between 2-6 using an alkaline reagent (e.g. sodium carbonate, sodium bicarbonate, lithium carbonate etc.) to form a dichlorotriazinyl derivative.

A second condensation is made of the dichlorotriazinyl and a compound of the general formula:

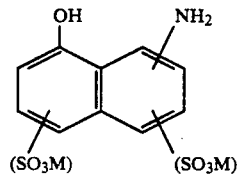

can be carried out at a temperature of 10–60 degrees Centigrade, over 1-10 hours, while maintaining the pH at 3-7 using a similar alkaline reagent as described above.

A final coupling reaction of the above synthesized intermediate with a diazonium compound, prepared from compounds of the general formula:

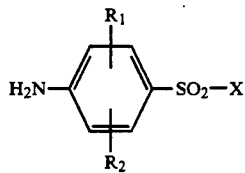

can be carried out at a temperature of 0–25 degrees Centigrade, over 1-10 hours, while controlling the pH at 4-7 using a suitable alkaline reagent. Typically the products are isolated in powder form by evaporation of the water. Alternatively the aqueous solutions can be stored for future use.

In the exhaust dyeing method, the textile substrate (e.g. fiber, yarn fabric, carpet etc.) is treated in an alkaline aqueous solution of the fiber reactive dye in the presence of substantially neutral inorganic salt electrolyte such as sodium chloride, sodium sulfate or Glauber salt which are the most commonly used inorganic salts. However, any inorganic salt having sufficient water solubility and purity can be used such as potassium chloride, potassium sulfate, potassium nitrate etc. Theoretically any nonreactive, inorganic salt can be used. However, economics generally dictate the uses of the less expensive salts such as sodium sulfate and sodium chloride.

The invention is useful in the dyeing of natural and synthetic materials containing hydroxy groups and materials containing carbonamide groups. Materials containing hydroxy groups are exemplified by materials such as cotton, linen, hemp, jute, rayon and viscose rayon. Materials containing carbonamide groups are the synthetic and natural polyamides and polyurethanes, for example synthetic nylons such as nylon 6, nylon 6-6, nylon 11 and the natural materials such as wool, silk, leather.

The exhaust dyeing procedure is well known. It is carried out in an aqueous bath at temperatures typically between 40° C. to 105° C., usually at the boil. The exhaust dyeing process may be conducted using a liquor ratio of about 1:3 to about 1:10 (weight of goods to weight of dye liquor). In the commercial exhaust dyeing practice, I find that a liquor ration from about 1:5 to about 1:10 is used. Additional dyeing auxiliaries appropriate to the circumstance may be added to the dye bath such as leveling agents, surfactants, buffers, water softeners etc.

A typical procedure for the dyeing of a cellulosic fiber such as cotton follows. The amount of dye, inorganic salt (NaCl) and alkali are represented by the letters x, y and z respectively. The fabric is prescoured or bleached and then the residual alkali is neutralized at 140° F. using acetic acid. The dye bath temperature is set at 80° F. and the auxiliary chemicals and x % of dye are added to the dye bath water. The water being present at a liquor ratio of 1:10. The bath is held ten minutes and then y grams/liter of sodium chloride are added. The bath is again held for ten minutes and z % alkali is added. The amount of inorganic salt (y) and alkali (z) used are dependent upon the amount of dye (x) used as seen in Table I, below. The bath is heated to 140° F. at a rate of 2° F. per minute and held at 140° F. for 45 minutes and then discharged. The bath is next filled with water, held ten minutes at 120° F. and discharged. The bath is then filled with water, neutralized at 120° F. using 56% acetic acid, held ten minutes and discharged. The fabric is given a final rinse at 120° F. with water. This dyeing procedure was used to dye the test specimens in the examples that follow. The color yield on the final product was determined using a computer assisted spectro photometric measurement technique which is well known in the industry.

In the exhaust dyeing process the amount of inorganic salt used to accelerate exhaustion of the dye bath varies depending upon the concentration of the dye employed in the dyeing. Generally, the lower the concentration of the dye the lower the inorganic salt content of the dye bath. Typically in the dyeing of cellulosic fibers such as cotton the following amount of salt would be used with corresponding dye concentration:

TABLE I

| | Requirements for Cotton 100% (Conventional) | | |
|---|---|---|---|
| % Dye* | Sodium Chloride g/l | Soda Ash % | 50% Caustic Soda % |
| 0–.5 | 20–50 | 5 | — |
| .5–2 | 80 | 5 | 1.0 |
| 2–4 | 100 | 5 | 2.0 |
| 4–6 | 100 | 5 | 2.5 |

According to the invention, the same dyeing procedure can be used. However, when this procedure is used in conjunction with the previously described dyes the amount of electrolyte can be reduced to those amounts as shown in Table II:

TABLE II

| | Requirements for Cotton 100% (The Invention) | | |
|---|---|---|---|
| % Dye* | Sodium Chloride g/l | Soda Ash % | 50% Caustic Soda % |
| 0–.5 | 10–15 | 5 | — |
| .5–2 | 25–50 | 5 | 1.0 |
| 2–4 | 25–50 | 5 | 2.0 |
| 4–6 | 25–50 | 5 | 2.5 |

*% Dye based upon weight of fabric as 100 percent dye content.

In the above tables, the soda ash and caustic additives provide the alkalinity necessary to convert the fiber reactive vinyl sulfone dye to its reactive state. The following examples illustrate the invention. Percentage values are percent by weight in this specification and the claims unless otherwise noted. Dye concentration expressed are likewise percent weight as 100 percent dye.

EXAMPLE 1 (Comparative)

Into a 2 liter beaker was charged 750 parts of water, 140.5 parts of 4-(β-sulfatoethylsulfonyl)-aniline and the pH was adjusted to 5.5 by the addition of 34.8 parts of sodium carbonate. The solution was clarified and added to a five liter beaker containing 750 parts of water, 400 pans of ice and 93.2 parts of cyanuric chloride while maintaining the pH at 4.5 by the addition of 88.8 parts of sodium bicarbonate. The reaction was stirred 4 hours, 159.5 parts of 5-amino-4-hydroxy-naphthalene-2,7-disulfonic acid were added and the pH adjusted to 4.5 by the addition of 42.0 parts of sodium carbonate.

Into a 2 liter beaker was charged 400 parts of water and 108.5 parts of 2-methoxy-5-methyl-aniline-4-sulfonic acid. The pH was adjusted to 6.5 using 42.9 parts of sodium carbonate, 89.3 pans of a 40% solution of sodium nitrite was added and then the solution was added to a 2 liter beaker containing 100 parts of water, 100 parts of 31% hydrochloric acid and 400 pans of ice. This solution was stirred one hour, added to the previously prepared coupling solution, the pH being maintained at 5.5 by the addition of 45.0 parts of sodium carbonate. 15 parts of sodium dihydrogen phosphate were added and the final product isolated by drying. 862.7 parts of a reddish powder were obtained, after blending to strength, having an absorption maximum at 560 nm and a dye content of 59.6%. The dye had the following structure:

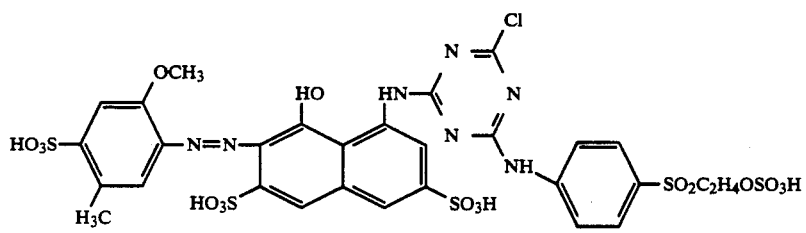

| | Exhaust Dyeing Evaluation (Comparative) Color Yield-CDU Values | | | | | |
|---|---|---|---|---|---|---|
| | G/L NaCl | | | | | |
| Dye Conc % | 100 | 80 | 50 | 25 | 20 | 10 |
| 0.12 | | | 0.1984 | | 0.1816 | 0.1740 |
| 0.30 | | | 0.3972 | | 0.3908 | 0.3695 |
| 0.60 | | 0.8163 | 0.7717 | 0.6977 | | |
| 1.19 | | 1.5148 | 1.3985 | 1.1677 | | |
| 2.38 | 2.5417 | | 2.3301 | 1.9982 | | |
| 3.58 | 3.2163 | | 2.9188 | 2.3737 | | |

EXAMPLE 2 (Invention)

Into a 1 liter beaker was charged 150 parts of water, 28.1 parts of 4-(β-sulfatoethylsulfonyl)-aniline and the pH was adjusted to 5.5 by the addition of 7.1 parts of sodium carbonate. The solution was clarified and added to a 1 liter beaker containing 150 pans of water, 80 parts of ice and 18.6 parts of cyanuric chloride while maintaining the pH at 4.5 by the addition of 17.6 parts of sodium bicarbonate, The reaction was stirred 4 hours, 31.9 parts of 5-amino-4-hydroxy-naphthalene-2,7-disulfonic acid were added and the pH adjusted to 4.5 by the addition of 8.1 parts of sodium carbonate.

Into a 1 liter beaker was charged 150 parts of water and 32.5 parts of 2-methoxy-5-methyl-aniline-4-(β-sulfatoethylsulfonyl). The pH was adjusted to 5.5 using 6.0 parts of sodium carbonate. The solution was clarified, 17.2 parts of a 40% solution of sodium nitrite was added and then the solution was added to a 1 liter beaker containing 150 parts of water, 25 parts of 31% hydrochloric acid and 80 parts of ice. This solution was stirred one hour, added to the previously prepared coupling solution, the pH being maintained at 5.5 by the addition of 4.6 parts of sodium carbonate. 3 parts of sodium dihydrogen phosphate were added and the final product isolated by drying. 228.5 parts of a reddish powder were obtained, after blending to strength, having an absorption maximum at 528 nm and a dye content of 49.6%. This dye had the following structure:

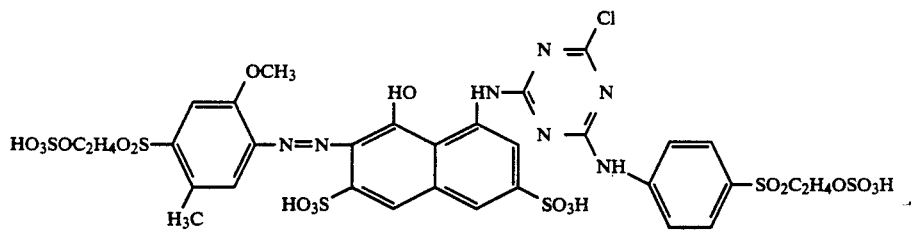

EXAMPLE 3-10

Dyes were prepared using the general procedures set forth in Examples 1 and 2. The dye's maximum absorption value and dye build up properties were measured for each dye. The chemical structure, maximum absorption/dye content and dye build up characteristics for each dye follows.

EXAMPLE 3-(Comparative)

This dye had the following structure:

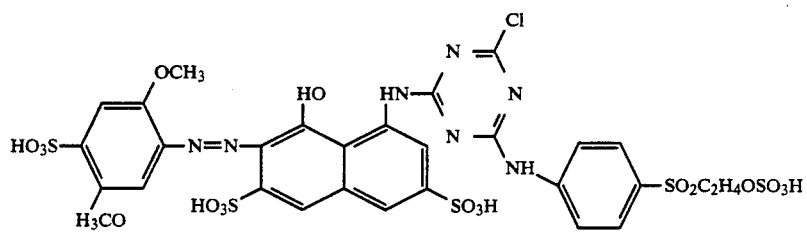

Maximum Absorption - 550 nm    Dye Content - 52.2%

| Dye Conc % | Exhaust Dyeing Evaluation (Invention) Color Yield-CDU Values | | | | | |
|---|---|---|---|---|---|---|
| | G/L NaCl | | | | | |
| | 100 | 80 | 50 | 25 | 20 | 10 |
| 0.10 | | | 0.1637 | | 0.1631 | 0.1634 |
| 0.25 | | | 0.3053 | 0.3367 | | 0.3536 |
| 0.50 | | 0.6691 | 0.6886 | 0.6918 | | |
| 0.99 | | 1.2277 | 1.3636 | 1.3027 | | |
| 1.99 | 2.1825 | | 2.2731 | 2.2359 | | |
| 2.98 | 2.6412 | | 2.9183 | 2.8845 | | |

| Dye Conc % | Exhaust Dyeing Evaluation (Comparative) Color Yield-CDU Values | | | | | |
|---|---|---|---|---|---|---|
| | G/L NaCl | | | | | |
| | 100 | 80 | 50 | 25 | 20 | 10 |
| 0.10 | | | 0.1521 | | 0.1418 | 0.1357 |
| 0.26 | | | 0.3053 | | 0.2495 | 0.2686 |
| 0.52 | | 0.6018 | 0.5592 | 0.4990 | | |
| 1.04 | | 1.0522 | 0.9874 | 0.8921 | | |
| 2.09 | 2.0068 | | 1.7725 | 1.5094 | | |
| 3.13 | 2.6094 | | 2.2500 | 1.7154 | | |

EXAMPLE 4-(Invention)

This dye had the following structure:

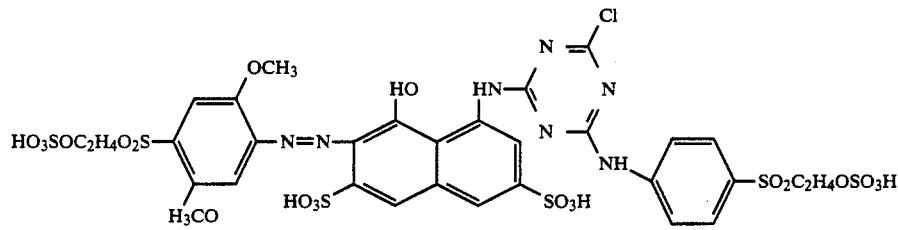

Absorption Maximum - 535 nm    Dye Content - 45.5%

| Dye Conc % | Exhaust Dyeing Evaluation (Invention) Color Yield-CDU Values | | | | | |
|---|---|---|---|---|---|---|
| | G/L NaCl | | | | | |
| | 100 | 80 | 50 | 25 | 20 | 10 |
| 0.09 | | | 0.1679 | | 0.1628 | 0.1586 |
| 0.23 | | | 0.3626 | | 0.3731 | 0.3374 |
| 0.45 | | 0.6576 | 0.6643 | 0.6490 | | |
| 0.91 | | 1.2104 | 1.2387 | 1.1809 | | |
| 1.82 | 1.9023 | | 2.2187 | 2.1255 | | |
| 2.73 | 2.5136 | | 2.7607 | 2.7744 | | |

EXAMPLE 5-(Comparative)

This dye had the following structure:

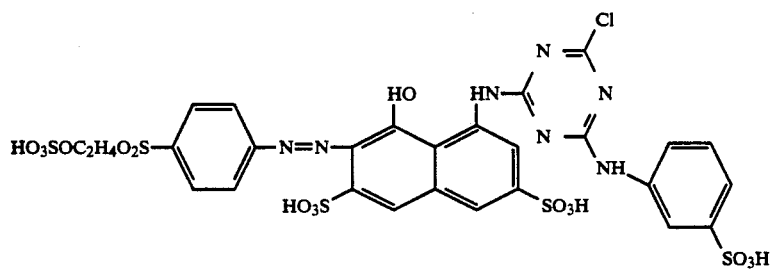

Maximum Absorption - 517 nm    Dye Content - 53.9%

| Exhaust Dyeing Evaluation (Comparative) Color Yield-CDU Values | | | | | |
|---|---|---|---|---|---|
| | | G/L NaCl | | | |
| Dye Conc % | 100 | 80 | 50 | 25 | 20 | 10 |
| 0.11 | | | 0.1699 | | 0.1491 | 0.1345 |
| 0.27 | | | 0.3537 | | 0.3437 | 0.2902 |
| 0.54 | | 0.7195 | 0.6227 | 0.5921 | | |
| 1.08 | | 1.2612 | 1.1351 | 0.9250 | | |
| 2.16 | 2.3794 | | 1.8029 | 1.3268 | | |
| 3.24 | 2.8284 | | 2.2602 | 1.6884 | | |

EXAMPLE 6-(Invention)

This dye had the following structure:

| Exhaust Dyeing Evaluation (Invention) Color Yield-CDU Values | | | | | |
|---|---|---|---|---|---|
| | | G/L NaCl | | | |
| Dye Conc % | 100 | 80 | 50 | 25 | 20 | 10 |
| 0.10 | | | 0.1756 | | 0.1643 | 0.1587 |
| 0.26 | | | 0.3720 | | 0.3491 | 0.3591 |
| 0.52 | | 0.7391 | 0.6960 | 0.6661 | | |
| 1.04 | | 1.3294 | 1.2722 | 1.2359 | | |
| 2.08 | 2.4234 | | 2.3237 | 2.2179 | | |
| 3.12 | 2.9075 | | 3.0765 | 2.7822 | | |

EXAMPLE 7-(Comparative)

This dye had the following structure:

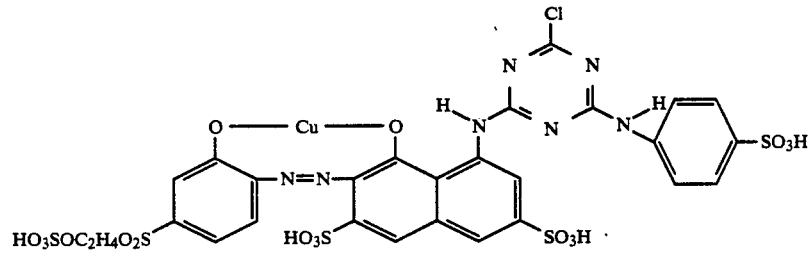

Maximum Absorption - 565 nm    Dye Content - 55.0%

| Exhaust Dyeing Evaluation (Comparative) Color Yield-CDU Values | | | | | |
|---|---|---|---|---|---|
| | | G/L NaCl | | | |
| Dye Conc % | 100 | 80 | 50 | 25 | 20 | 10 |
| 0.11 | | | 0.1650 | | 0.1524 | 0.0997 |
| 0.28 | | | 0.3462 | | 0.3417 | 0.3104 |
| 0.55 | | 0.7087 | 0.6769 | 0.5967 | | |
| 1.10 | | 1.2630 | 1.1614 | 0.9967 | | |

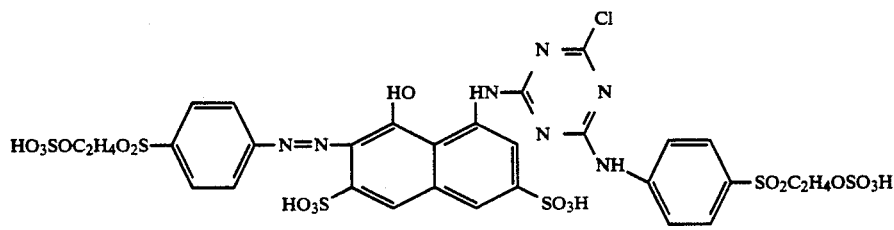

Maximum Absorption - 520 nm    Dye Content - 52.0%

EXAMPLE 9-(Comparative)

This dye had the following structure:

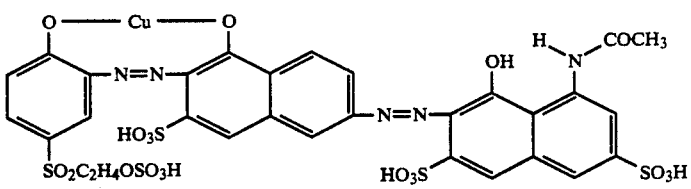

Maximum Absorption - 567 nm    Dye Content - 33.4%

-continued

| Exhaust Dyeing Evaluation (Comparative) Color Yield-CDU Values | | | | | |
|---|---|---|---|---|---|
| Dye | G/L NaCl | | | | |
| Conc % | 100 | 80 | 50 | 25 | 20 | 10 |
| 2.20 | 2.1823 | | 2.0415 | 1.6035 | | |
| 3.30 | 2.9027 | | 2.4195 | 2.0156 | | |

| Exhaust Dyeing Evaluation (Comparative) Color Yield-CDU Values | | | | | | |
|---|---|---|---|---|---|---|
| Dye | G/L NaCl | | | | | |
| Conc % | 100 | 80 | 50 | 25 | 20 | 10 |
| 0.07 | | | 0.2170 | | 0.2049 | 0.1901 |
| 0.17 | | | 0.4465 | | 0.4282 | 0.3845 |
| 0.33 | | 0.9559 | 0.9980 | 0.8919 | | |
| 0.67 | | 1.8603 | 1.7329 | 1.6311 | | |
| 1.34 | | 3.4060 | 3.2588 | 3.0899 | | |
| 2.01 | | 4.5896 | 4.4336 | 3.9447 | | |

EXAMPLE 8-(Invention)

This dye had the following structure:

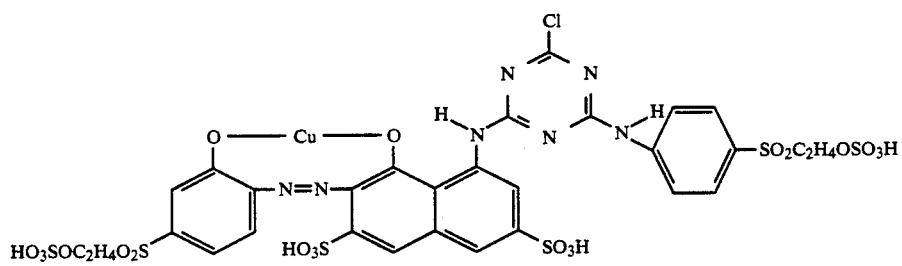

Maximum Absorption - 562 nm    Dye Content - 53.2%

EXAMPLE 10- (Invention)

This dye had the following structure:

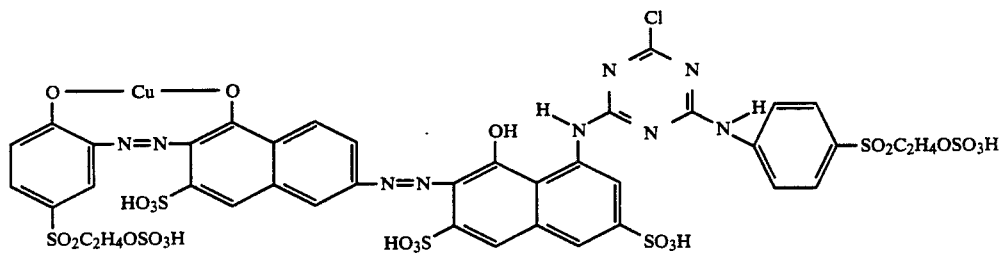

Maximum Absorption - 582 nm    Dye Content - 56.6%

| Exhaust Dyeing Evaluation (Invention) Color Yield-CDU Values | | | | | | |
|---|---|---|---|---|---|---|
| Dye | G/L NaCl | | | | | |
| Conc % | 100 | 80 | 50 | 25 | 20 | 10 |
| 0.11 | | | 0.1414 | | 0.1744 | 0.1601 |
| 0.27 | | | 0.3636 | | 0.3702 | 0.3613 |
| 0.53 | | 0.7706 | 0.7165 | 0.6808 | | |
| 1.06 | | 1.3245 | 1.3024 | 1.1922 | | |
| 2.13 | 1.7595 | | 2.1969 | 1.9949 | | |
| 3.19 | 2.0055 | | 2.6617 | 2.5153 | | |

| Exhaust Dyeing Evaluation (Invention) Color Yield-CDU Values | | | | | | |
|---|---|---|---|---|---|---|
| Dye | G/L NaCl | | | | | |
| Conc % | 100 | 80 | 50 | 25 | 20 | 10 |
| 0.11 | | | 0.3106 | | 0.2932 | 0.2891 |
| 0.28 | | | 0.6324 | | 0.6433 | 0.6142 |

-continued

| Exhaust Dyeing Evaluation (Invention) Color Yield-CDU Values | | | | | | |
|---|---|---|---|---|---|---|
| Dye Conc % | G/L NaCl | | | | | |
| | 100 | 80 | 50 | 25 | 20 | 10 |
| 0.57 | | 1.1479 | 1.2065 | 1.2202 | | |
| 1.13 | | 2.1053 | 2.1411 | 2.2136 | | |
| 2.27 | 3.1746 | | 3.4978 | 3.6631 | | |
| 3.40 | 4.0767 | | 4.2582 | 4.2764 | | |

The above examples show the advantages of the process of the inventions i.e. high color build up, reduced electrolyte consumption and reduced waste discharge to the environment. The following table illustrates the advantages of the invention. The examples (even numbered examples) within the invention are printed in bold face print for ease of comparison of the results.

| Example | NaCl G/L | Dye % | Color Yield CDU |
|---|---|---|---|
| 1 | 100 | 3.6 | 3.2 |
| 1 | 50 | 3.6 | 2.4 |
| 2 | 100 | 3.0 | 2.6 |
| 2 | 50 | 3.0 | 2.9 |
| 3 | 100 | 3.1 | 2.6 |
| 3 | 50 | 3.1 | 2.3 |
| 4 | 100 | 2.7 | 2.5 |
| 4 | 50 | 2.7 | 2.7 |
| 5 | 100 | 3.2 | 2.8 |
| 5 | 50 | 3.2 | 2.3 |
| 6 | 100 | 3.1 | 2.9 |
| 6 | 50 | 3.1 | 3.1 |
| 7 | 100 | 3.3 | 2.9 |
| 7 | 50 | 3.3 | 2.4 |
| 8 | 100 | 3.2 | 2.0 |
| 8 | 50 | 3.2 | 2.7 |
| 9 | 100 | 2.0 | 4.6 |
| 9 | 50 | 2.0 | 4.4 |
| 10 | 100 | 2.3 | 3.2 |
| 10 | 25 | 2.3 | 3.7 |

The foregoing examples illustrate the advantages of the invention and are not intended to limit the scope of the claims.

Examination of the above data shows that when the salt content of the dye bath is reduced the color build value decreases in the comparative (prior art) examples. However, in the examples of the invention, the color yield actually increases with decreased salt concentration.

We claim:

1. A method for dyeing a substrate containing hydroxyl or carbamide groups comprising contacting said substrate with an aqueous solution of a dye of the formula:

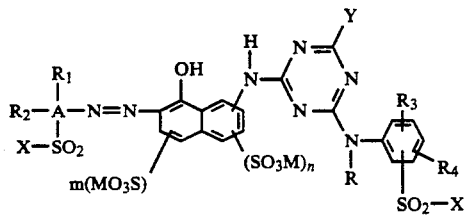

wherein:

M represents a hydrogen atom, or an alkali or alkaline earth metal; n and m are 0 or 1;

A is a benzene nucleus or a naphthalene nucleus;

R is hydrogen or an alkyl group having 1 to 4 carbon atoms;

$R_1$ and $R_2$ are hydrogen, hydroxyl, an alkyl group having 1 to 4 carbon atoms, an alkoxy group having 1 to 4 carbon atoms, $R_1$ and $R_2$ are the same or different;

$R_3$ and $R_4$ are hydrogen, an alkyl group having 1 to 4 carbon atoms, an alkoxy group having 1 to 4 carbon atoms, $R_3$ and $R_4$ are the same or different;

X is a vinyl group, or a fiber reactive group of the general formula $—CH_2CH_2—Z$ wherein Z is chloro, sulfato, thiosulfato or phosphato, sulfato; Y is selected from chlorine, bromine or fluorine, and the copper, cobalt, chrome and nickel metal complexes thereof.

wherein:

said dye is present in an amount from about 0.5 to about 6% by weight based on the weight of said substrate and wherein said aqueous solution contains an inert inorganic salt in about the following amounts relative to said dye concentration:

| % Dye | Salt g/l |
|---|---|
| 0–.5 | 10–15 |
| .5–2 | 25–50 |
| 2–4 | 25–50 |
| 4–6 | 25–50. |

2. A method according to claim 1 wherein said inorganic salt is a sodium chloride.

3. A method according to claim 1 wherein said inorganic salt is a sodium sulfate.

4. A method according to claim 1 wherein said dye has the following formula:

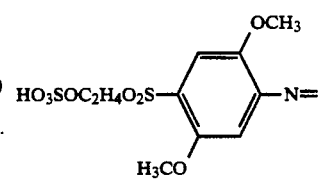

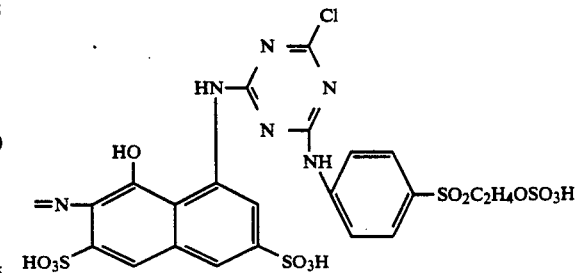

5. A method according to claim 1 wherein said dye has the following formula:

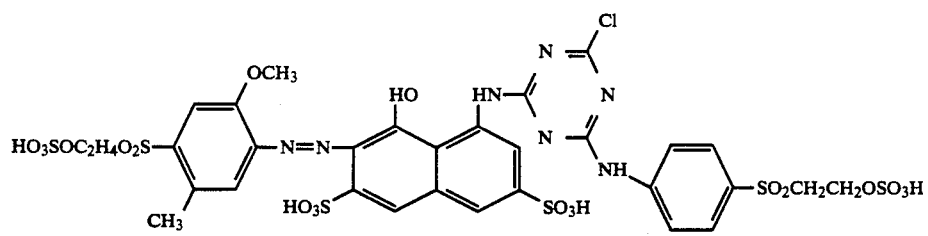
6. A method according to claim 1 wherein said dye has the following formula:
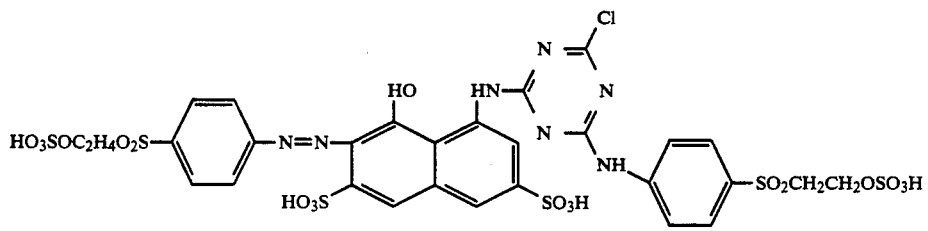
7. A method according to claim 1 wherein $R_1$ is OH or an alkoxy group having 1 to 4 carbon atoms and said dye is a copper complex having the following formula:
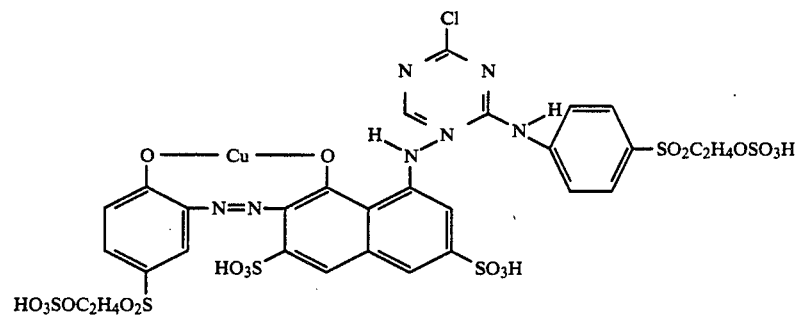
* * * * *